United States Patent
Shi et al.

(10) Patent No.: US 12,025,066 B1
(45) Date of Patent: Jul. 2, 2024

(54) INTELLIGENT VARIABLE MODE CONTROL METHOD FOR VARIABLE ALTITUDE TURBOCHARGING SYSTEM OF DIESEL ENGINE

(71) Applicant: Shanghai Jiao Tong University, Shanghai (CN)

(72) Inventors: Lei Shi, Shanghai (CN); Ling Leng, Shanghai (CN); Ziqiang Chen, Shanghai (CN); Junwei Li, Shanghai (CN); Kangyao Deng, Shanghai (CN)

(73) Assignee: Shanhai Jiao Tong University, Shanghai (CN)

( * ) Notice: Subject to any disclaimer, the term of this patent is extended or adjusted under 35 U.S.C. 154(b) by 0 days.

(21) Appl. No.: 18/594,369

(22) Filed: Mar. 4, 2024

(30) Foreign Application Priority Data

Mar. 28, 2023 (CN) .......................... 202310309206.1

(51) Int. Cl.
*F02D 41/00* (2006.01)
*F02D 41/14* (2006.01)

(52) U.S. Cl.
CPC ..... *F02D 41/0007* (2013.01); *F02D 41/1404* (2013.01)

(58) Field of Classification Search
CPC .......................... F02D 41/0007; F02D 41/1404
See application file for complete search history.

(56) References Cited

U.S. PATENT DOCUMENTS

| | | | |
|---|---|---|---|
| 5,191,789 A | * | 3/1993 | Furuya .................. F02D 41/182 73/114.33 |
| 5,289,684 A | | 3/1994 | Yoshioka et al. |

(Continued)

FOREIGN PATENT DOCUMENTS

| | | |
|---|---|---|
| CN | 109854394 A | 6/2019 |
| CN | 110529234 A | 12/2019 |

(Continued)

OTHER PUBLICATIONS

Self-adapting Control Strategy of Diesel Engine with RegulatedTwo-stage Turbocharging System on Highland Li Hualei , Li Oi, Shi Lei, Deng Kangyao, Xing Weidong, Liu Ying Transactions of the Chinese Society for Agricultural Machinery 2015,46(09),335-342.

(Continued)

*Primary Examiner* — Carl C Staubach
(74) *Attorney, Agent, or Firm* — Woodard, Emhardt, Henry, Reeves & Wagner, LLP

(57) ABSTRACT

An intelligent variable mode control method for variable altitude turbocharging system of diesel engine, including: querying turbocharging pressure MAP chart upon speed and torque demands; reading a target pressure, and correcting it to obtain a corrected pressure; based on adaptive ranges of flow-pressure ratio of turbocharging modes, using fuzzy control algorithms to achieve intelligent selection of turbo-charging modes; initializing opening degrees of high- and low-pressure stage bypass valves within adjustment ranges; using neural network fast prediction models to predict turbocharging pressures; using genetic algorithms to fast search bypass valve opening degrees corresponding the target and send them to the valve control unit. The invention achieves turbocharging mode selection and precise turbo-charging pressure control during variable altitude operation of diesel engines, and achieves model-based intelligent variable mode adaptive optimization control of variable altitude diesel engine turbocharging systems.

2 Claims, 2 Drawing Sheets

(56) References Cited

U.S. PATENT DOCUMENTS

| | | | | |
|---|---|---|---|---|
| 5,796,917 | A * | 8/1998 | Matranga | G06N 7/04 706/4 |
| 5,850,737 | A * | 12/1998 | Aschner | F02D 41/0007 60/602 |
| 6,216,083 | B1 * | 4/2001 | Ulyanov | F02D 41/1402 701/115 |
| 6,405,122 | B1 * | 6/2002 | Yamaguchi | G06N 3/043 706/31 |
| 7,035,834 | B2 * | 4/2006 | Jacobson | F02D 41/1405 706/26 |
| 7,222,112 | B2 * | 5/2007 | Jacobson | G05B 13/027 706/39 |
| 7,533,075 | B1 * | 5/2009 | Soferman | G06N 5/048 706/14 |
| 8,156,472 | B2 * | 4/2012 | Meredith | G06F 9/46 717/136 |
| 9,200,578 | B2 * | 12/2015 | Flohr | F02B 37/013 |
| 9,951,698 | B2 * | 4/2018 | Suchy | F02D 41/1446 |
| 10,041,397 | B2 * | 8/2018 | Saeki | F02D 41/20 |
| 10,940,954 | B2 * | 3/2021 | Fass | F02B 37/18 |
| 11,143,575 | B2 * | 10/2021 | Chen | G01M 15/102 |
| 2003/0217021 | A1 * | 11/2003 | Jacobson | F02D 41/1405 701/99 |
| 2009/0217663 | A1 * | 9/2009 | Buis | F02D 41/0007 60/602 |
| 2014/0148928 | A1 * | 5/2014 | Stewart | F02D 41/2432 700/32 |
| 2017/0037794 | A1 * | 2/2017 | Ting | F02P 17/12 |
| 2022/0316387 | A1 * | 10/2022 | Blythe | F02G 5/02 |
| 2024/0135137 | A1 * | 4/2024 | Wang | G06N 3/006 |

FOREIGN PATENT DOCUMENTS

| | | |
|---|---|---|
| CN | 111075578 A | 4/2020 |
| CN | 111963327 A | 11/2020 |
| CN | 114060143 A | 2/2022 |

OTHER PUBLICATIONS

A Research on the Full Condition Control Strategy for the Turbocharging System of Diesel Engines at Varying Altitudes Li Hualei, Hu Zhilong, Cao Jie, Shi Lei , Zhang Huiyan , Gu Yuncheng, Deng Kangyao Automotive Engineering 2016,(07),791-799.

* cited by examiner

INTELLIGENT VARIABLE MODE CONTROL METHOD FOR VARIABLE ALTITUDE TURBOCHARGING SYSTEM OF DIESEL ENGINE

FIELD OF THE DISCLOSURE

The present application involves a turbocharging mode control method in the technical field of diesel engine turbocharging, and particularly involves an intelligent variable mode control method for variable altitude turbocharging system of diesel engine with two turbochargers.

BACKGROUND

China is one of the countries with the highest plateau altitudes and the largest areas in the world. The country's land area with an altitude of 1,000 meters or more above the sea level is 5.558 million square kilometers, accounting for approximately 57.9% of China's total land area. In addition, the terrain of China is complex and diverse, with a vast mountainous area and a wide range of altitude changes in plateau terrains.

When diesel engines operate at varying altitudes, the variation range of intake air pressure and temperature is large, resulting in problems such as a decrease in the output power of the diesel engine, an increase in fuel consumption, and worsening emissions. To improve its adaptability to adapt to varying altitudes and to meet the air intake needs in the full range of working conditions at different altitudes, it is necessary to achieve reasonable control of the variable mode and the bypass valve opening of the diesel engine turbocharging system. At the same time, changes in environmental parameters cause significant changes in the characteristics of the control system, and the stability, anti-interference performance and other control characteristics of the controller decline.

To accurately control the variable altitude operation of the turbocharging system, it is necessary to carry out relevant research on the control method of the variable altitude turbocharging system to achieve precise control of the turbocharging pressure at variable altitudes and to improve the anti-interference performance and transient characteristics of the control system at different altitudes. However, there are no relevant patents in the prior arts.

SUMMARY OF THE INVENTION

In view of the shortcomings of the existing technologies, the present invention proposes an intelligent variable mode control method for a variable altitude turbocharging system of diesel engine, which can intelligently select the turbocharging combination mode and adjust the bypass valve opening according to changes in altitude and engine operating conditions, to meet the requirements of the turbocharging pressure of the engine in the full working condition range under various altitude conditions, and to achieve the recovery of diesel engine performance under different altitudes and working conditions.

The present invention is realized through the following technical solutions.

The present invention comprises the following steps: step one: querying a turbocharging pressure MAP chart according to demand signals of speed and torque of the diesel engine, and reading a target turbocharging pressure, and correcting the target turbocharging pressure based on an intake environmental temperature under altitude environmental conditions measured by a temperature sensor upstream of a low-pressure stage compressor, to obtain a corrected target turbocharging pressure; and, step two: using a fuzzy control algorithm to carry out intelligent selection of variable turbocharging modes based on adaptive ranges of flow and pressure ratio in single-stage and two-stage turbocharging modes, to obtain an adjustment range of high- and low-pressure stage bypass valve opening degrees; and, step three: under actual environmental conditions at different altitudes, initializing the opening degrees of the high- and low-pressure stage bypass valves within the adjustment range, and using a neural network rapid prediction model of diesel engine turbocharging pressure to carry out turbocharging pressure prediction for the variable altitude turbocharging system.

And step four: using a genetic algorithm to fast search opening degrees of the high- and low-pressure stage bypass valves in a corresponding turbocharging mode until the turbocharging pressure reaches a corresponding target value, to output to a valve control unit of the bypass valves.

Preferably, in step one, a principle of correcting the target turbocharging pressure is that, under partial load conditions, a two-stage turbocharging system uses economic adjustment rules to achieve a lowest fuel consumption, while under full-load conditions, priority is given to meet power needs.

More preferably, in step two, the fuzzy control algorithm comprises: fuzzifying the real-time signals of speed, throttle, and altitude; and using the fuzzified signals as inputs of variable mode control fuzzy rules of the turbocharging system to complete a fuzzy inference process; and selecting a turbocharging mode based on an output obtained by the inference process; and obtaining the adjustment range of the high- and low-pressure stage bypass valves.

Wherein, the speed is divided into seven levels according to the signal of speed: a critical low speed XS of 800-1000 rpm, a low speed S of 1000-1200 rpm, a medium low speed MS of 1200-1400 rpm, a medium speed M of 1400-1600 rpm, a medium high speed MB of 1600-1800 rpm, a high speed B of 1800-2000 rpm, and a critical high speed XB of 2000-2300 rpm; and, according to changes in altitude, the altitude is divided into: a low altitude L of 0-1500 m, a medium high altitude O of 1500-3000 m, a high altitude H of 3000-4500 m; and, a symmetrical triangle is selected as a membership function; and the fuzzy rules for the intelligent variable mode control method for variable altitude turbocharging system of diesel engine are established based on adaptable ranges of flow and pressure ratio in different turbocharging modes (one-stage, two-stage); and a COG anti-fuzzy method is used to obtain a turbocharging mode for current operating conditions and altitude, and the adjustment range of the high- and low-pressure stage bypass valves is determined according to the turbocharging mode.

More preferably, in step three, the neural network rapid prediction model of diesel engine turbocharging pressure adopts a BP neural network model; wherein, according to engine speed and torque operating conditions, inlet temperatures and pressures of high- and low-pressure stage compressors, and opening degrees of the high- and low-pressure stage bypass valves are used as input layer neurons to predict a diesel engine turbocharging pressure under current operating conditions; and wherein the cost function for neural network training is:

$$J = \frac{1}{2}(P_{test} - P_{pre})^2 + \varphi \sum_{i=1}^{n} \theta_i^2$$

wherein, is a measured turbocharging pressure in Pa; and is a turbocharging pressure predicted by the neural network in Pa; and is a regularization parameter used to minimize a weight matrix during an optimization search process to obtain a most stable fast prediction model of the turbocharging pressure; and n is the number of input neurons of the BP neural network; and $\theta_i$ is a weight coefficient.

More preferably, in step four, the genetic algorithm fast searches opening degrees of the high- and low-pressure stage bypass valves in the corresponding turbocharging mode, and binary rules are used to encode the opening degrees of the bypass valves, and a population number is initialized to 50, and differences between the target turbocharging pressure and predicted turbocharging pressures are used as a fitness function for individual evaluations; wherein a calculation formula of the fitness function is:

$$F(t)=lg(|P_{obj}-P_{pre}|)+1$$

wherein, t is an evolutionary algebra, and is the corrected target turbocharging pressure in Pa; and is the predicted turbocharging pressure in Pa.

More preferably, in step four, the genetic algorithm selects excellent individuals to inherit to a next generation population based on individual fitness, wherein a crossover probability is 0.8, and a mutation probability is 0.1, and a termination condition is: if a predetermined number of evolutionary generations is reached, or an average fitness of the population has no significant improvement in several consecutive generations, then the individual with a maximum fitness obtained during an evolutionary search process is selected as an optimal solution output, to obtain optimal opening degrees of the high- and low-pressure stage bypass valves which meet air intake requirements at varying altitudes, and meet needs for variable mode adaptation of the diesel engine in all working conditions at varying altitudes.

Compared with the existing technologies, the present invention has the following beneficial effects. This method solves the problem of the selection of turbocharging modes and the problem of significant errors in the control of the turbocharging pressure of the variable turbocharging system during variable altitude operation of diesel engines. Under transient conditions, the model-based feedforward control algorithm can quickly adjust the opening of the high- and low-pressure stage turbine bypass valves to target values, while meeting the tracking accuracy requirements of the actual turbocharging pressure and the target turbocharging pressure, realizing model-based variable altitude diesel engine turbocharging. The system's intelligent variable mode can adaptively optimize the control, to meet the air intake needs of different altitudes and working conditions.

EXPLANATION OF REFERENCE NUMBERS

1. Diesel engine, 2. High-pressure stage intercooler, 3. High-pressure stage compressor, 4. Low-pressure stage intercooler, 5. Low-pressure stage turbine, 6. High-pressure stage turbine, 7. High-pressure stage turbine bypass valve, 8. Low-pressure stage turbine bypass valve, 9. Valve control unit, 10. Electronic control unit, 11. Pressure and temperature sensor downstream of high-pressure stage intercooler, 12. Pressure and temperature sensor upstream of high-pressure stage intercooler, 13. Pressure and temperature sensor downstream of low-pressure stage intercooler, 14. Pressure and temperature sensor upstream of low-pressure stage intercooler, 15. Intake pressure and temperature sensor, 16. Low-pressure stage turbocharger speed sensor, 17. Pressure and temperature sensor downstream of turbines, 18. Pressure and temperature sensor between turbines, 19. Pressure and temperature sensor upstream of turbines, 20. High pressure stage turbocharger speed sensor, 21. Low pressure stage compressor, 22. Diesel engine intake pipeline, 23. Diesel engine exhaust pipeline road.

DESCRIPTION OF THE ILLUSTRATED EMBODIMENTS

The embodiments of the present invention will be described in detail below with reference to the accompanying drawings. These embodiments are based on the technical solution of the present invention and provides detailed implementation modes and specific operating processes. However, the protection scope of the present invention is not limited to the following embodiments.

Embodiments

Figure 1:
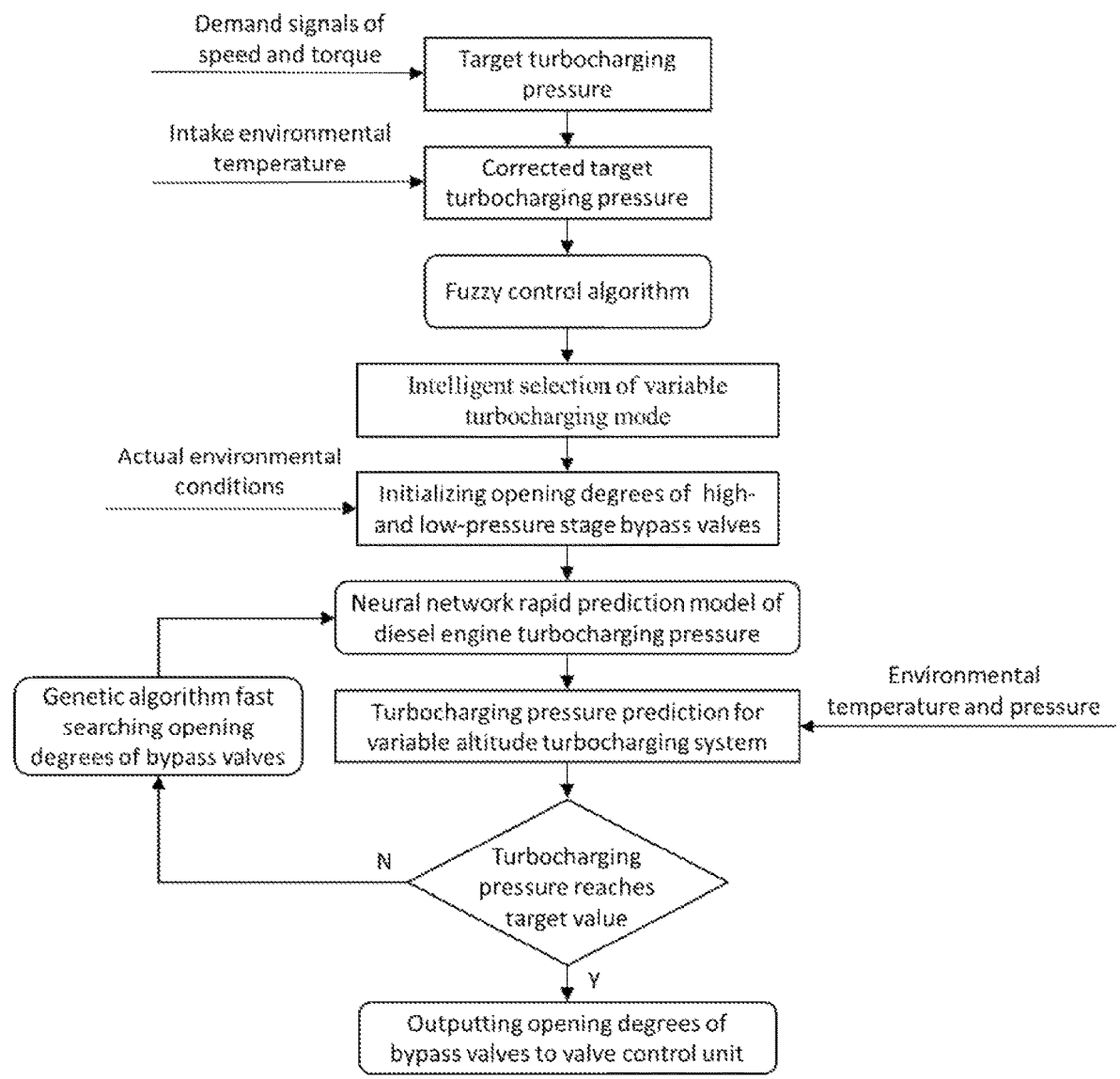
FIG. 1 is a flow chart of the method of the present invention.
Figure 2:
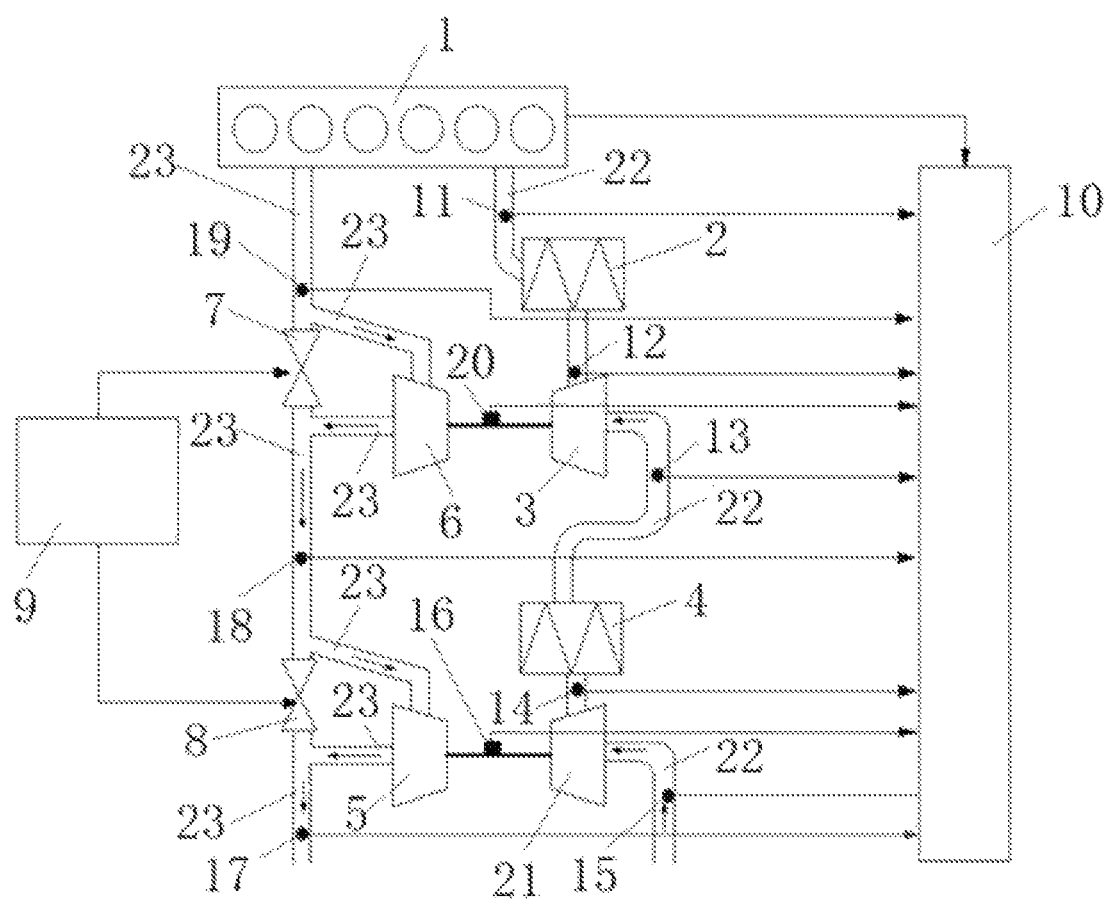
FIG. 2 is a schematic structural diagram of an adjustable two-stage turbocharging system in an embodiment of the present invention.

The flow chart of an embodiment of the present invention is shown in FIG. 1, and the structural diagram of an embodiment of the present invention is shown in FIG. 2.

As shown in FIG. 2, the embodiment of the present invention includes a diesel engine 1, a high-pressure stage intercooler 2, a high-pressure stage compressor 3, a low-pressure stage intercooler 4, a low-pressure stage turbine 5, a high-pressure stage turbine 6, and a high-pressure stage turbine bypass valve 7, a low-pressure stage turbine bypass valve 8, a valve control unit 9, an electronic control unit 10, a pressure and temperature sensor downstream of high-pressure stage intercooler 11, a pressure and temperature sensor upstream of high-pressure stage intercooler 12, a pressure and temperature sensor downstream of low-pressure stage intercooler 13, a pressure and temperature sensor upstream of low-pressure stage intercooler 14, an intake pressure and temperature sensor 15, a low-pressure stage turbocharger speed sensor 16, a pressure and temperature sensor downstream of turbines 17, a pressure and temperature sensor between turbines 18, a pressure and temperature sensor upstream of turbines 19, a high-pressure stage turbocharger speed sensor 20, a low-pressure stage compressor 21, a diesel engine intake pipeline 22, a diesel engine exhaust pipeline 23.

The outlet of the diesel engine air intake pipeline 22 is connected to the inlet of the diesel engine 1. The inlet of the diesel engine exhaust pipeline 23 is connected to the exhaust of the diesel engine 1. Along the direction of the intake air flow, the low-pressure stage compressor 21, the low-pressure stage intercooler 4, the high-pressure stage compressor 3, and the high-pressure stage intercooler 2 are connected in series by the diesel engine intake pipeline 22. Along the direction of the exhaust flow, the high-pressure stage turbine 6 and the low-pressure stage turbine 5 are connected in series by the diesel engine exhaust pipeline 23. The low-pressure stage compressor 21 and the low-pressure stage turbine 5 are coaxially connected. The high-pressure stage compressor 3 and the high-pressure stage turbine 6 are coaxially connected. The inlet and outlet of the high-pressure stage turbine bypass valve 7 are respectively connected to the diesel exhaust pipelines 23 at places upstream of and downstream of the high-pressure stage turbine 6. The inlet and outlet of the low-pressure stage turbine bypass valve 8 are respectively connected to the diesel engine exhaust pipelines 23 at places upstream of and downstream of the low-pressure stage turbine 5. The high-pressure stage turbine bypass valve 7 and the low-pressure stage turbine bypass valve 8 are connected to the valve control unit 9 through wiring harnesses.

The pressure and temperature sensor 11 downstream of the high-pressure stage intercooler is arranged on the diesel engine intake pipeline 22 downstream of the high-pressure stage intercooler 2, and the pressure and temperature sensor 12 upstream of the high-pressure stage intercooler is arranged between the high-pressure stage intercooler 2 and the high-pressure stage compressor 3. The pressure and temperature sensor 13 downstream of the low-pressure stage intercooler is arranged on the diesel engine intake pipeline 22 between the high-pressure stage compressor 3 and the low-pressure stage intercooler 4. The pressure and temperature sensor 14 upstream of the low-pressure stage intercooler is arranged on the diesel engine intake pipeline 22 between the low-pressure stage intercooler 4 and the low-pressure stage compressor 21, and the intake pressure and temperature sensor 15 is arranged on the diesel engine intake pipeline 22 upstream of the low-pressure stage compressor 21.

The pressure and temperature sensor 17 downstream of low-pressure stage turbine is arranged on the diesel engine exhaust pipeline 23 downstream of the low-pressure stage turbine 5, and the pressure and temperature sensor 18 between turbines is arranged on the diesel engine exhaust pipeline 23 between the low-pressure stage turbine 5 and the high-pressure stage turbine 6. The pressure and temperature sensor 19 upstream of turbines is arranged on the diesel engine exhaust pipeline 23 upstream of the high-pressure stage turbine 6.

The low-pressure stage turbocharger speed sensor 16 is arranged on the connecting shaft between the low-pressure stage compressor 21 and the low-pressure stage turbine 5. The high-pressure stage turbocharger speed sensor 20 is arranged on the connecting shaft between the high-pressure stage compressor 3 and the high-pressure stage turbine 6. The pressure and temperature sensor 11 downstream of high-pressure stage intercooler, the pressure and temperature sensor 12 upstream of high-pressure stage intercooler, the pressure and temperature sensor 13 downstream of low-pressure stage intercooler, the pressure and temperature sensor 14 upstream of low-pressure stage intercooler, the intake pressure and temperature sensor 15, the low-pressure stage turbocharger speed sensor 16, the pressure and temperature sensor 17 downstream of turbines, the pressure and temperature sensor 18 between turbines, the pressure and temperature sensor 19 upstream of the turbines, and the high-pressure stage turbocharger speed sensor 20 are all connected to the electronic control unit 10 through wiring harnesses.

The implementation process of the present embodiment is as follows.

First, based on the demand signals of speed and torque, the MAP chart of turbocharging pressure is queried, and the target turbocharging pressure is read, and the target turbocharging pressure is corrected based on the intake temperature measured by the temperature sensor upstream of the low-pressure stage compressor to obtain the corrected target turbocharging pressure. Under partial load conditions, the correction of the target turbocharging pressure of the two-stage turbocharging system is based on economic adjustment rules to achieve the lowest fuel consumption. Under full-load conditions, the correction of the target turbocharging pressure gives priority to meeting power needs.

Then, based on the adaptable range of flow and pressure ratio in different turbocharging modes (single-stage, two-stage), a fuzzy control algorithm is used to fuzzify the real-time signals of speed, throttle and altitude, and the fuzzy signals are used as the input of fuzzy control rules of the variable mode turbocharging system, to complete a fuzzy inference process. The turbocharging mode is selected based on the output obtained by the inference process, and the adjustment range of the high- and low-pressure stage turbine bypass valves is obtained.

The speed is divided into seven levels according to the speed signal: a critical low speed (XS) of 800-1000 rpm, a low speed (S) of 1000-1200 rpm, a medium low speed (MS) of 1200-1400 rpm, a medium speed (M) of 1400-1600 rpm, a medium high speed (MB) of 1600-1800 rpm, a high speed (B) of 1800-2000 rpm, a critical high speed (XB) of 2000-2300 rpm. And according to changes in altitude, the altitude is divided into: a low altitude (L) of 0-1500 m, a medium high altitude (O) of 1500-3000 m, a high altitude (H) of 3000-4500 m.

A symmetrical triangle is selected as the membership function. Based on the adaptable ranges of flow and pressure ratio in different turbocharging modes (single-stage, two-stage), fuzzy rules for the intelligent variable mode control method for variable altitude turbocharging system are established. A COG anti-fuzzy method is used to obtain the turbocharging mode under the current operating condition and altitude, and the adjustment range of the high- and low-pressure stage bypass valves is determined according to the turbocharging mode.

Then, under actual environmental conditions at different altitudes, the opening degrees of the high- and low-pressure stage bypass valves are initialized within the adjustment range. A BP neural network model is adopted as the neural network fast prediction model of the diesel engine turbocharging pressure. According to the engine speed and torque operating conditions, the inlet temperatures, and pressures of the high- and low-pressure stage compressors, and opening degrees of the high- and low-pressure stage bypass valves are used as input layer neurons, to predict the diesel engine turbocharging pressure under the current working conditions. The loss function of the neural network training is:

$$J = \frac{1}{2}(P_{test} - P_{pre})^2 + \varphi \sum_{i=1}^{n} \theta_i^2$$

Wherein, is the measured boost pressure, with a unit of Pa. And is the predicted turbocharging pressure predicted by the neural network, with a unit of Pa. And is the regularization parameter, used to minimize the weight matrix during the optimization search process to obtain the most stable fast prediction model of the turbocharging pressure. And n is the number of input neurons of the BP neural network, and $\theta_i$ is the weight coefficient.

Finally, a genetic algorithm is used to fast search the opening degrees of the high- and low-pressure stage bypass valves in the corresponding turbocharging mode. Binary rules are used to encode the opening degrees of the bypass valves. The initial population number is 50. The target turbocharging pressure is compared with the predicted turbocharging pressure. The difference in pressure is used as the fitness function of individual evaluation. The calculation formula of the fitness function is:

$$F(t)=lg(|P_{obj}-P_{pre}|)+1$$

In the formula, t is the evolutionary algebra, and is the corrected target turbocharging pressure, in Pa; and is the predicted turbocharging pressure, in Pa.

The genetic algorithm selects excellent individuals based on their individual fitness and inherits them to the next generation population. The crossover probability is 0.8, and the mutation probability is 0.1. The termination condition is: if the predetermined number of evolutionary generations is reached, or the average fitness of the population is basically without improvement for several consecutive generations, then the individual with the maximum fitness obtained during the evolutionary search process is selected as the optimal solution output, to obtain the optimal high- and low-pressure stage bypass valve opening degrees that meet the intake requirements at variable altitudes, and to output them to the valve control unit. The needs of the variable mode adaptation of the diesel engine in all working conditions at varying altitudes can be met, and the requirements for turbocharging pressure of the engine in all working conditions at various altitudes can be fulfilled, and diesel engine performance recovery under different altitudes and working conditions can be achieved.

Through offline fuzzy calculation analysis, the fuzzy rules for selecting the turbocharging mode under 20% load are shown in Table 1, and the fuzzy rules for selecting the turbocharging mode under 100% load are shown in Table 2. During the actual control processes, the fuzzy rule control tables are queried, and a turbocharging mode can be obtained based on the current engine speed, load, and operating altitude. As shown in the tables, a two-stage turbocharging mode is applied at high speeds and high altitudes, and a single-stage turbocharging mode is applied at lower engine speeds. The opening degrees of the turbine bypass valves are appropriately adjusted according to the engine load.

TABLE 1

Fuzzy rules for selecting turbocharging modes under 20% load.

| ALT | RPM | | | | | | |
|---|---|---|---|---|---|---|---|
| | XS | S | MS | M | MB | B | XB |
| H | 1 | 0 | 0 | 0 | 0 | 0 | 0 |
| O | 1 | 1 | 0 | 0 | 0 | −1 | −1 |
| L | 1 | 1 | 0 | 0 | −1 | −1 | −1 |

TABLE 2

Fuzzy rules for selecting turbocharging modes under 100% load.

| ALT | RPM | | | | | | |
|---|---|---|---|---|---|---|---|
| | XS | S | MS | M | MB | B | XB |
| H | 1 | 0 | 0 | 0 | 0 | 0 | 0 |
| O | 1 | 0 | 0 | 0 | 0 | −1 | −1 |
| L | 1 | 0 | 0 | 0 | −1 | −1 | −1 |

The above embodiments are only illustrative of the design principles and uses of the present invention, and are not intended to limit the present invention. Anyone familiar with this area of technology can modify or change the above embodiments without departing from the spirit and scope of the invention. Therefore, all equivalent modifications or changes made by those with ordinary knowledge in the technical field without departing from the spirit and technical ideas disclosed in the present invention shall still be covered by the claims of the present invention.

The invention claimed is:

1. An intelligent variable mode control method for variable altitude turbocharging system of diesel engine, characterized by comprising:

step one: querying a turbocharging pressure MAP chart according to demand signals of speed and torque of the diesel engine, and reading a target turbocharging pressure, and correcting the target turbocharging pressure based on an intake environmental temperature under altitude environmental conditions measured by a temperature sensor upstream of a low-pressure stage compressor, to obtain a corrected target turbocharging pressure; and, step two: using a fuzzy control algorithm to carry out intelligent selection of variable turbocharging mode based on adaptive ranges of flow and pressure ratio in single-stage and two-stage turbocharging modes, to obtain an adjustment range of high- and low-pressure stage bypass valve opening degrees; and, step three: under actual environmental conditions at different altitudes, initializing the opening degrees of the high- and low-pressure stage bypass valves within the adjustment range, and using a neural network rapid prediction model of diesel engine turbocharging pressure to carry out turbocharging pressure prediction for the variable altitude turbocharging system; and, step four: using a genetic algorithm to fast search opening degrees of the high- and low-pressure stage bypass valves in a corresponding turbocharging mode until the turbocharging pressure reaches a corresponding target value, to output to a valve control unit of the bypass valves; wherein in step two, the fuzzy control algorithm comprises: fuzzifying the real-time signals of speed, throttle, and altitude; and using the fuzzified signals as inputs of variable mode control fuzzy rules of the turbocharging system to complete a fuzzy inference process; and selecting a turbocharging mode based on an output obtained by the inference process; and obtaining the adjustment range of the high- and low-pressure stage bypass valves;

wherein, the speed is divided into seven levels according to the original speed: a critical low speed XS of 800-1000 rpm, a low speed S of 1000-1200 rpm, a medium low speed MS of 1200-1400 rpm, a medium speed M of 1400-1600 rpm, a medium high speed MB of 1600-1800 rpm, a high speed B of 1800-2000 rpm, and a critical high speed XB of 2000-2300 rpm; and, according to changes in altitude, the altitude is divided into: a low altitude L of 0-1500 m, a medium high altitude O of 1500-3000 m, a high altitude H of 3000-4500 m; and, a symmetrical triangle is selected as a membership function; and the fuzzy rule for the intelligent variable mode control method for variable altitude turbocharging system of diesel engine are establish based on adaptable ranges of flow and pressure ratio in different turbocharging modes; and a COG anti-fuzzy method is used to obtain a turbocharging mode for current operating conditions and altitude, and the adjustment range of the high- and low-pressure stage bypass valves is determined according to the turbocharging mode; wherein the different turbocharging modes are one-state mode and a two-stage mode; and, in step three, the neural network rapid prediction model of diesel engine turbocharging pressure adopts a BP neural network model; wherein, according to engine speed and torque operating conditions, inlet temperatures and pressures of high- and low-pressure stage compressors, and opening degrees of the high- and low-pressure stage bypass valves are used as input layer neurons to predict a diesel engine turbocharging pressure under current operating conditions; and wherein the cost function for neural network training is:

$$J = \frac{1}{2}(P_{test} - P_{pre})^2 + \varphi \sum_{i=1}^{n} \theta_i^2;$$

wherein, $P_{test}$ is a measure turbocharging pressure in Pa; and $P_{pre}$ is a turbocharging pressure predicted by the neural network in Pa; and φ is a regularization parameter used to minimize a weight matrix during an optimization search press to obtain a most stable fast prediction model of the turbocharging pressure; and n in the number of input neurons of the BP neural network; and $\theta_i$ is a weight coefficient; and, in step four, the genetic algorithm fast searches opening degrees of the high- and low-pressure stage bypass valves in the corresponding turbocharging mode, and binary rules are used to encode the opening degrees of the bypass valves, and a population number is initialized to 50, and differences between the target turbocharging pressure and predicted turbocharging pressures are used as a fitness function for individual evaluations;

wherein a calculation formula of the fitness function is:

$$F(t) = lg(|P_{obj} - P_{pre}|) + 1$$

wherein, t is an evolutionary algebra, and $P_{obj}$ is the corrected target turbocharging pressure in Pa; and $P_{pre}$ is the predicted turbocharging pressure in Pa; and, the genetic algorithm selects excellent individuals to inherit to a next generation population based on individual fitness, wherein a crossover probability is 0.8, and a mutation probability is 0.1, and a termination condition is: if a predetermined number of evolutionary generations is reached, or an average fitness of the population has no significant improvement in several consecutive generations, then the individual with a maximum fitness obtained during an evolutionary search process is selected as an optimal solution output, to obtain optimal opening degrees of the high- and low-pressure stage bypass valves which meet air intake requirements at varying altitudes, and meet needs for variable mode adaptation of the diesel engine in all working conditions at varying altitudes.

2. The intelligent variable mode control method for variable altitude turbocharging system of diesel engine according to claim 1, characterized in that, in step one, a principle of correcting the target turbocharging pressure is that, under partial load conditions, the stage turbocharging system uses economic adjustment rules to achieve a lowest fuel consumption, while under fad-load conditions, priority is given to meet power needs.

\* \* \* \* \*

UNITED STATES PATENT AND TRADEMARK OFFICE
CERTIFICATE OF CORRECTION

| | | |
|---|---|---|
| PATENT NO. | : 12,025,066 B1 | |
| APPLICATION NO. | : 18/594369 | |
| DATED | : July 2, 2024 | |
| INVENTOR(S) | : Lei Shi | |

It is certified that error appears in the above-identified patent and that said Letters Patent is hereby corrected as shown below:

In the Claims

In Column 10, Line 29, it is requested that "stage" be replaced with --two stage--

Signed and Sealed this
Thirteenth Day of August, 2024

Katherine Kelly Vidal
*Director of the United States Patent and Trademark Office*